United States Patent [19]

Morshedi et al.

[11] Patent Number: 5,481,716
[45] Date of Patent: Jan. 2, 1996

[54] PROCESS FOR MACHINE GENERATION OF A CONTROL PROCESS PROGRAM

[75] Inventors: A. M. Morshedi; Thomas E. Stevenson; David E. Scott, all of Houston, Tex.

[73] Assignee: Dynamic Optimization Technology Products, Inc., Houston, Tex.

[21] Appl. No.: 176,117

[22] Filed: Dec. 30, 1993

[51] Int. Cl.$^6$ .............................. G06F 1/100; G06F 9/45
[52] U.S. Cl. ..................... 395/700; 364/DIG. 1; 364/DIG. 2; 364/191; 364/281.7; 364/188; 364/187
[58] Field of Search .................. 364/300, 187, 364/188, 200, DIG. 1; 395/700

[56] References Cited

U.S. PATENT DOCUMENTS

| | | | |
|---|---|---|---|
| 4,796,179 | 1/1989 | Lehman et al. | 364/300 |
| 4,873,623 | 10/1989 | Lane et al. | 364/188 |
| 4,959,768 | 9/1990 | Gerhart | 364/187 |
| 5,339,419 | 8/1994 | Chan et al. | 395/700 |

*Primary Examiner*—Kevin A. Kriess
*Assistant Examiner*—Majid Banankhah
*Attorney, Agent, or Firm*—Arnold, White & Durkee

[57] ABSTRACT

The invention relates to a method for the automatic generation of a control process program on a computer. One illustrative embodiment, referred to as STAR-GEN, is described as it might be implemented on a general purpose computer using a suitable high-level language such as Fortran. Through a graphical user interface, STAR-GEN prompts the user for (1) system specific information, (2) problem-specific information, and (3) control process-specific information. When all of these data have been entered, STAR-GEN automatically generates a process control (source) program which is independent of a target computer platform. This source program can be transferred to a specific process control computer where it is compiled for execution using a standard, for example Fortran, compiler. A unique and beneficial aspect of the invention includes its ability to provide the user with a consistent development environment regardless of the specific hardware platform (computer) the process control program is to execute on. Another beneficial feature of the invention is that it allows a user to generate a process control program for a variety of hardware platforms without the user knowing how to program each target platform.

5 Claims, 6 Drawing Sheets

Microfiche Appendix Included
(3 Microfiche, 4 Pages)

(3 Microfiche, 4 Pages)

Figure 6

PROCESS FOR MACHINE GENERATION OF A CONTROL PROCESS PROGRAM

TABLE OF CONTENTS

1. BACKGROUND OF THE INVENTION
2. SUMMARY OF THE INVENTION
3. BRIEF DESCRIPTION OF THE DRAWINGS
4. DETAILED DESCRIPTION OF SPECIFIC EMBODIMENT
   4.1 Process Control Program Generation Using the Invention
   4.2 Implementation Details
      4.2(a) Generation of a Control Computer Library
      4.2(b) An Extension of STAR-GEN's Capabilities
5. CLAIMS
   ABSTRACT

1. BACKGROUND OF THE INVENTION

This invention relates to a method for the automatic generation of a multivariable, dynamic, control process on a programmable machine. Microfiche appendices A, B, and C, including 4 microfiche containing a total of 265 frames (pages), set out selected user manuals and documentation from a copyrighted commercial software package distributed by the assignee of this patent document under the trademark STAR, STAR-GEN, and STAR-EDIT respectively. Permission is granted to make copies of the appendices solely in connection with the making of facsimile copies of this patent document in accordance with applicable law; all other rights are reserved, and all other reproduction, distribution, creation of derivative works based on the contents, public display, and public performance of the microfiche appendices or any part thereof are prohibited by the copyright laws.

The male gender is used from time to time herein for convenience and should be understood to encompass the female gender as well.

Figure 1A:
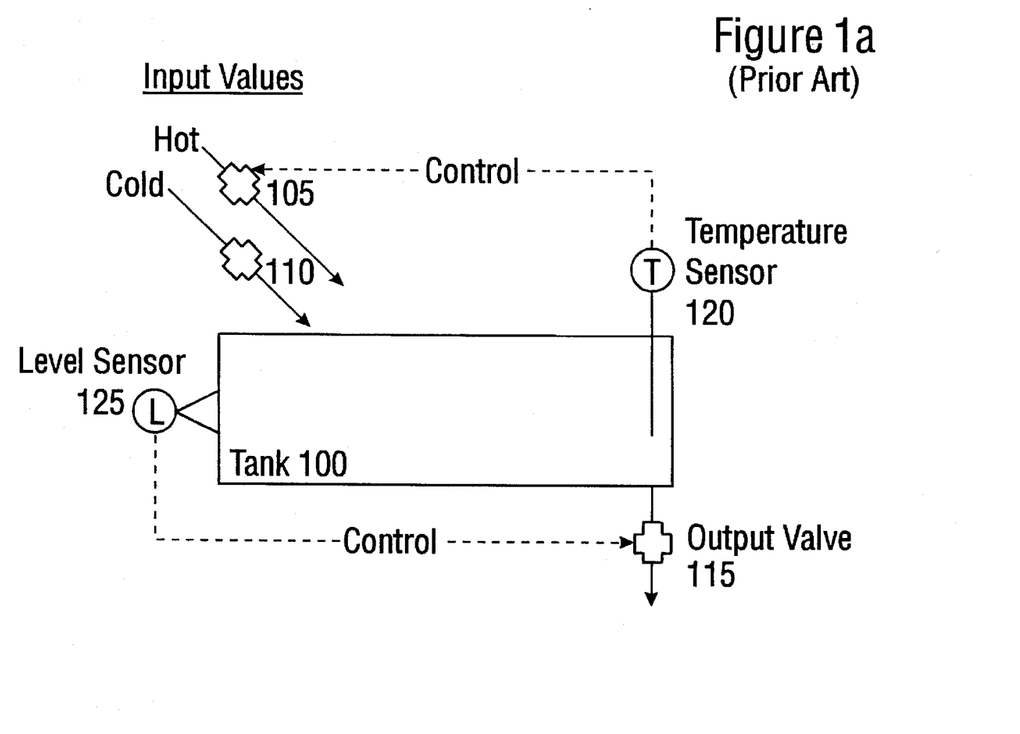

One traditional type of control process is illustrated in FIG. 1a. In this example, the goal is to maintain both the temperature and fluid level in a tank 100 within predetermined ranges. The rates of hot and cold inflow are controlled by input valves 105 and 110 respectively, while the rate of outflow is controlled by an output valve 115. Temperature sensor 120 is used to control the tank's temperature via the hot water input valve 105. Level sensor 125 is used to control the tank's level via output valve 115.

One difficulty in a control system such as that shown in FIG. 1a is that the relationship between fluid level and temperature is not as straightforward as that assumed in the figure. For example, the hot water input valve 105 can affect both the temperature and the level of the tank's fluid. Potentially complex interactions between the control elements (e.g., input valves 105 and 110 and output valve 115) result in a lack of precise control of the tank's fluid level and temperature.

Figure 1B:
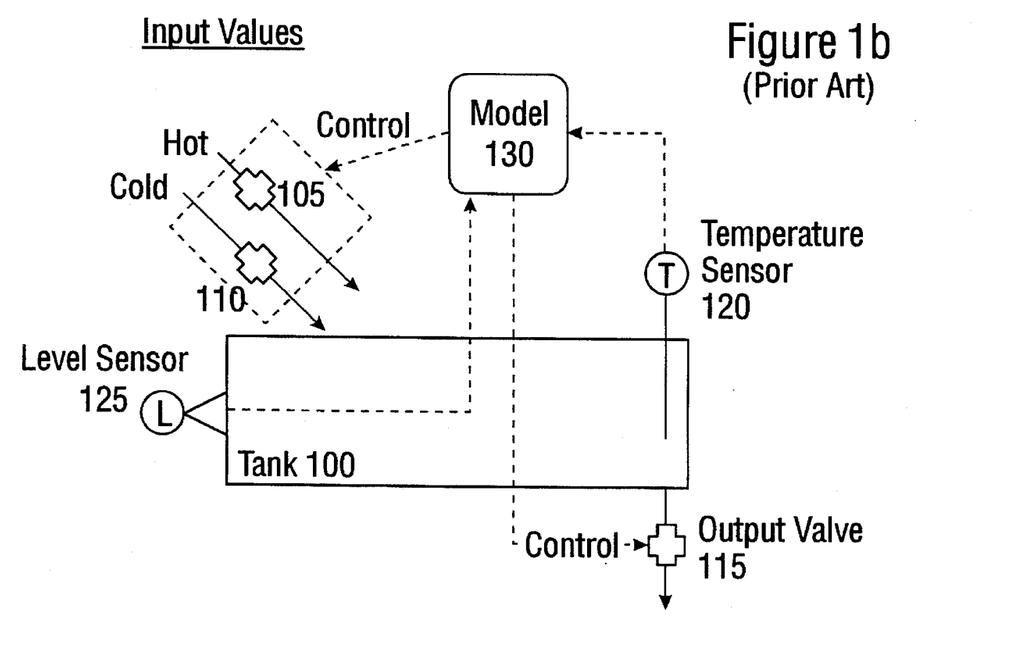
FIG. 1b represents a multivariable approach to control of the same system.

A technique known as multivariable control theory has been developed to address this type of problem. FIG. 1b illustrates a multivariable control system approach to maintaining the temperature and fluid level in the system introduced in FIG. 1a. Here, sensors 120 and 125 provide input to a (mathematical) model 130 of the fluid-tank system that is being controlled. The process response relationships between input and output valve positions and the tank's level and temperature are explicitly captured in the system's model. Multivariable control techniques allow a more precise and robust control mechanism to be specified for a given problem. The improved control permitted by this approach is the reason for pursuing the more complex task of specifying and designing multivariable control systems.

Figure 2:
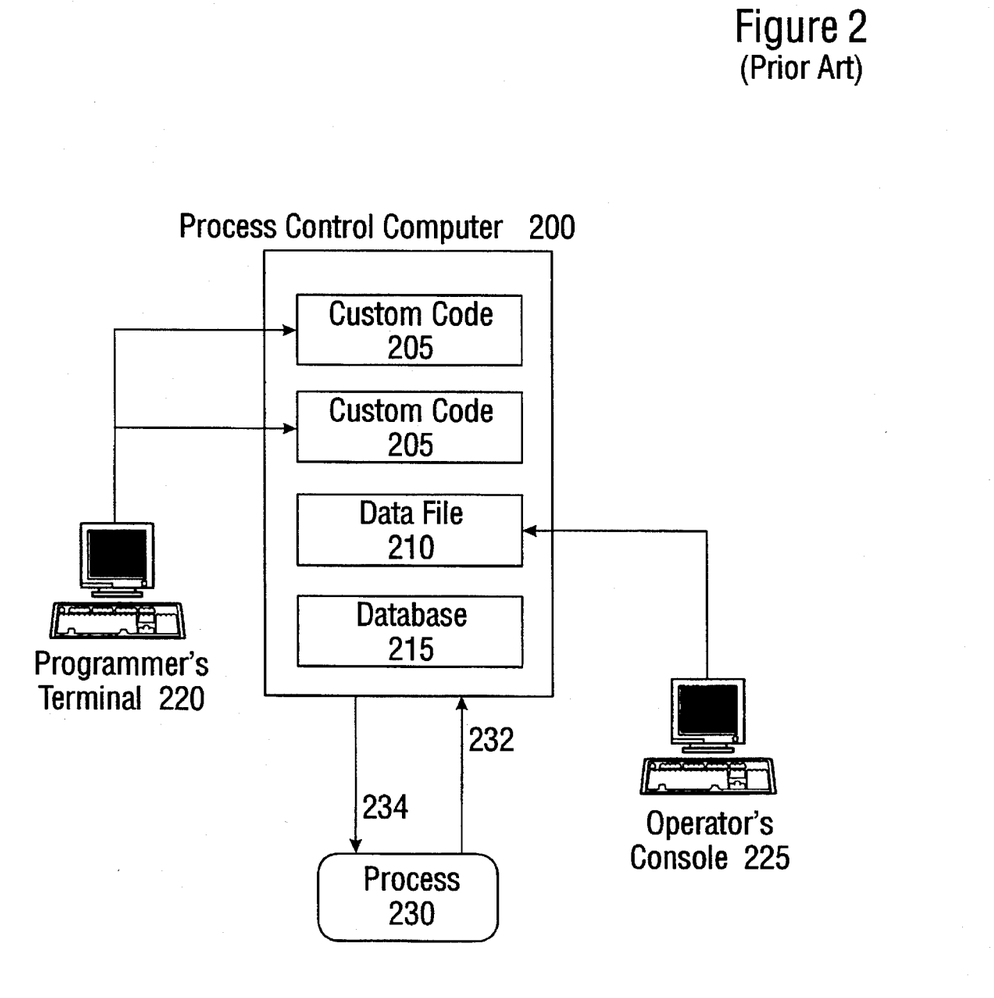
FIG. 2 is a block diagram representing a conventional means of generating a process control program.

In a traditional approach to creating a computer program for process control, shown in FIG. 2, system-specific information relating to the program such as the method for accessing the data and the requirements of the code are incorporated throughout a custom code 205 created by a programmer, who would sit at a programmer's terminal 220 and actually edit that information into the custom code. Examples of such information could include whether character strings should be enclosed within single-quotes or double quotes or whether integers should be 2-bytes or 4-bytes long. Similarly, the problem-specific information such as the number of variables in a problem and the names of each variable would also be entered into the custom code by a programmer.

Another type of problem-specific information that may need to be entered by a programmer creating custom code is the location of the given problem's sensor values, i.e., the locations of these data in the database 215 where the database is typically a group of memory locations in the process control computer 200.

Another aspect of the process control program is the particular information that is specific to the process to be controlled. Process-specific information might include control target values and control limit values. For instance, the desired temperature of the tank 100 in FIG. 1a could be a control target value while the positional limits of the hot and cold water valves, 105 and 110 respectively, could be control limit values.

Variables such as control priorities and the process's model information could also be entered into the process control computer 200 by an engineer sitting at an operator's console 225. This type of information could be stored in a data file 210. While shown as a distinct element in FIG. 2, this data file 210 could be a part of the database 215. That is, it could be in the memory of the process control computer.

When the process control program runs in the process control computer, it would then access the data from the database and calculate new values for the manipulated variables (e.g., the hot and cold water valve positions and the output valve position of FIG. 1). These newly calculated values could then be stored into the database 215. Once stored, these values could be sent to the process 230 being controlled.

As an example, data flow 234 could indicate that new targets for the process's valves (hot cold and outlet) are sent out to the plant. In response to these changes in the manipulated variables, sensors such as the tank level 125 and temperature 120 would change and the new values of these sensor readings are brought into the process control computer via the data flow shown as arrow 232.

Among the problems that are inherent in creating a computer program using this traditional method are that the number of variables and number of data locations is, possibly, very large and, therefore, the amount of custom code that must be created is also very large. This can lead to two problems: 1) a large amount of time is consumed in creating a custom code, and 2) programming is error-prone and, as such, the custom code could have a lot of errors that need to be found and removed.

In contrast, the method of this invention captures and automates the mechanism of data entry and the creation of the custom code 205, reducing the amount of time required as well as the number of errors that are introduced therein. The automatically generated control program can, through a suitable interface, be used to control a target system such as that shown in FIG. 1. Other examples of systems that can be controlled in this manner include, without limitation, a mechanical lathe or milling tool, a concrete kiln, a wave soldering system, paper mill, and distillation column.

2. SUMMARY OF THE INVENTION

A method in accordance with the invention, referred to herein as STAR-GEN, is implemented via a computer program to provide a means for the automatic generation of a platform-independent process control program.

Through a graphical user interface, STAR-GEN prompts the user for (1) system-specific information such as the dam access method and the code requirements for the selected process control computer, (2) problem-specific information such as the number of variables associated with a specific process control problem and the data locations in the process control computer's database where values of those data can be found, and (3) process-specific information such as the targets for the controlled variables, limits for manipulated variables, controller priorities, and process response relationships. When all of these data have been entered, STAR-GEN automatically generates a process control (source) program that is independent of the target platform, e.g., process control computer. This source program can be transferred to a specific process control computer where it is compiled for execution using a standard, for example Fortran, compiler.

In the hierarchy established by this invention, the purpose of some of the system information is to describe how the problem-specific information should be processed to create the platform independent source code. The problem-specific information, as encoded, is in turn used by the process control program to enable retrieval of the process-specific information from the process control computer data base.

A beneficial aspect of the invention is its ability to provide the user with a consistent development environment regardless of the specific hardware platform or operating system (computer) on which the process control program is to execute. Another beneficial feature of the invention is that it allows a user to generate process control programs for a variety of hardware platforms without knowing how to program each target platform.

3. BRIEF DESCRIPTION OF THE DRAWINGS

FIG. 1 consisting of 1a and 1b, is a block diagram representation of an illustrative control system. FIG. 1a represents a traditional approach to system control while

4. DETAILED DESCRIPTION OF SPECIFIC EMBODIMENT

One illustrative embodiment of the invention is described below as it might be implemented in software, e.g., as one or more programs of instructions encoded in a program storage device, on a general purpose computer using a suitable high-level language such as Fortran, C, or Pascal. In the interest of clarity, not all features of an actual implementation are described in this specification. It will of course be appreciated that in the development of any such actual implementation (as in any software development project), numerous implementation-specific decisions must be made to achieve the developers' specific goals and subgoals, such as compliance with system- and business-related constraints, which will vary from one implementation to another. Moreover, it will be appreciated that such a development effort might be complex and time-consuming, but would nevertheless be a routine undertaking of software engineering for those of ordinary skill having the benefit of this disclosure.

4.1 Process Control Program Generation Using the Invention

Figure 3:
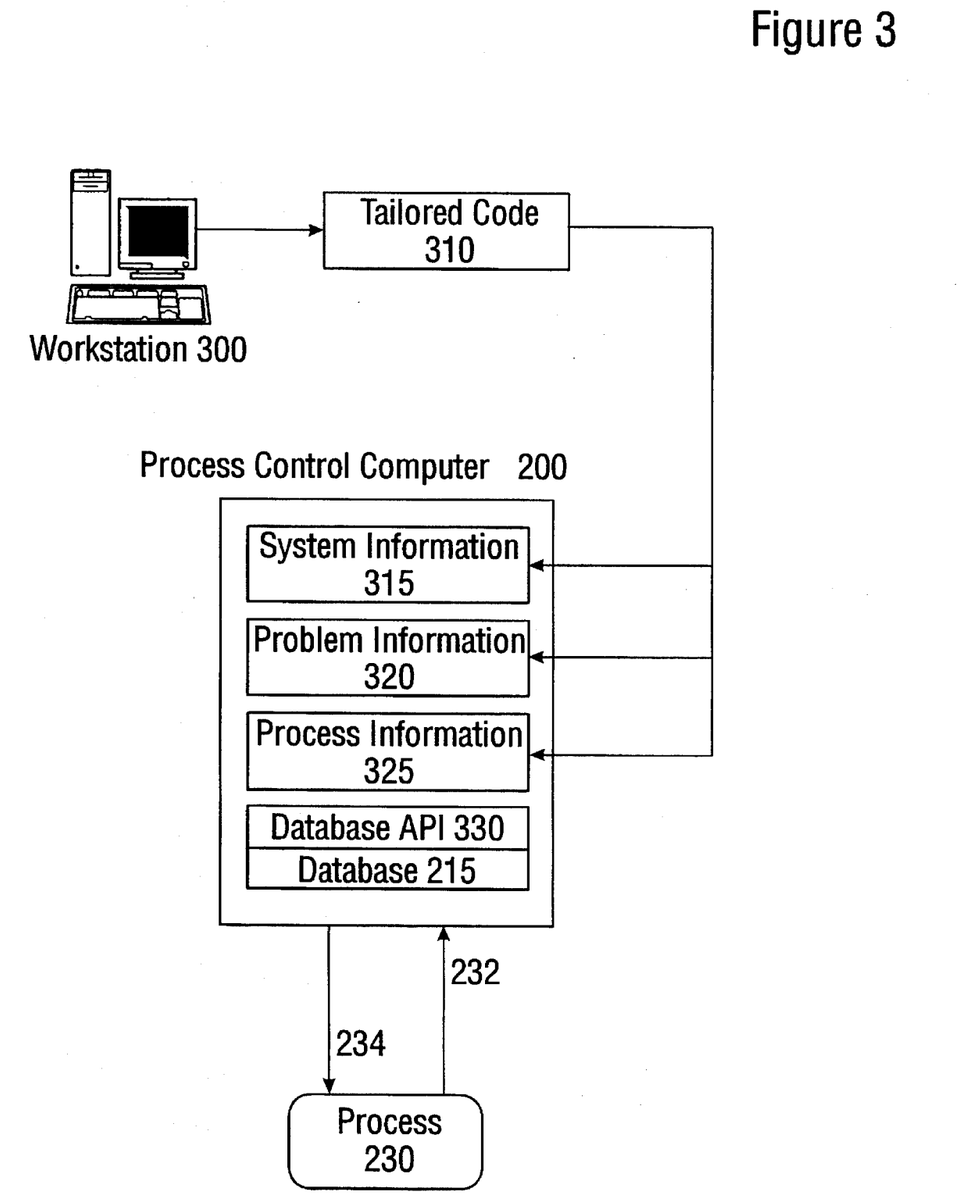
FIG. 3 is a block diagram representing a means of generating a process control program using the method of the invention.

FIG. 3 depicts the procedure for creating a process control program by the method of the invention. Here, the control engineer uses a workstation 300 which might be, for instance, a personal computer (PC) running the Microsoft Windows operating system, to access a system menu through which he can select a type of process control computer system the target and operating system hardware platform upon which the process control program will run. The system menu option also allows the control engineer to specify system-specific information, such as the data access method and the code requirements for the selected process control computer. Examples of system menus can be seen in Appendix B, sections "STAR-GEN Preferences," and "Select a Predefined STAR-GEN Template."

Through problem definition menus, the control engineer is able to enter information such as the number of variables associated with a specific process control problem and the data locations in the process control computer's database where values of those data can be found. Examples of problem definition menus can be found in Appendix B, sections "Size a New Database," and "Auto-Allocation: Base Tags, Base Parameters, and Base Files."

Through a process menu the control engineer is able to enter information such as the targets for the controlled variables, limits for the manipulated variables, controller priorities and process response relationships. When all of these dam have been entered into the workstation 300, tailored code 310 for the process control program is generated automatically. This tailored code may be quite lengthy but it can be quickly generated because all of the necessary information has been entered easily through the workstation. Example of process menus may be found in Appendix C, sections "CV Information," "IV Information," and "MV Information."

The tailored code, transferred to the process control computer 200, contains a representation of system information 315, problem-specific information 320, and process information 325. The system and problem information are used during every control cycle while the process information is used only once to setup the initial database, i.e., to initialize the process control program. Thereafter, new values of the process information are read from the database using the system and problem information encoded in the process control program.

FIG. 3 also shows the database API 330 (application program interface) which defines the methods by which the program may access information in the database 215. A description of how to prepare an API is found in microfiche Appendix A, Section "Creating a Star-ID Template."

Figure 4:
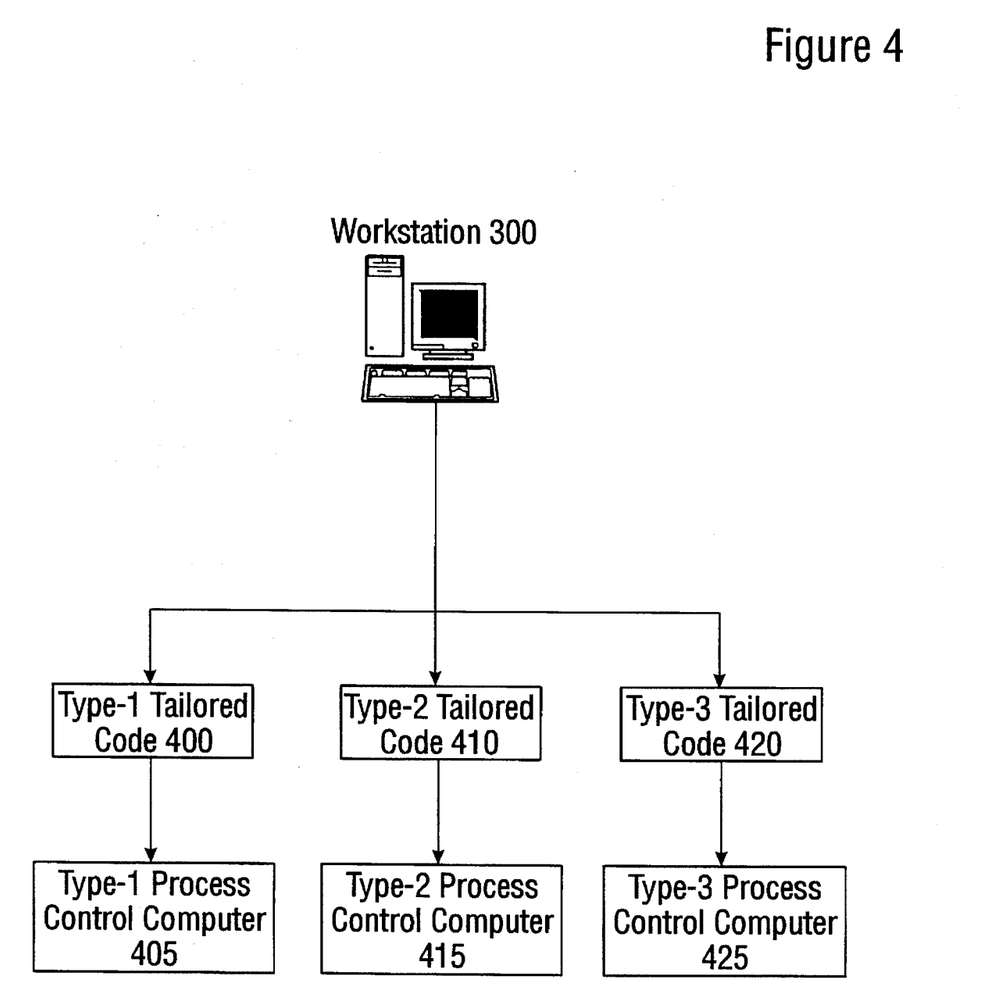
FIG. 4 is a block diagram showing that the invention provides a generic interface for the development of process control programs that can run on a number of different process control computers.

FIG. 4 shows a particularly valuable aspect of the invention. It may be that an engineer is required to generate process control programs for a number of different processes which are controlled by a number of different types of process control computers. For instance, control computer type-1 400 might be a MODCOMP computer running the SPARCS process control subsystem. Control computer type-2 might be a DEC VAX computer running the SET-CON process control subsystem while control computer type-3 might be a DEC VAX computer running the PI process control subsystem.

In the traditional method of control process program generation where an engineer created customized code for each individual application, the engineer would be required to have detailed knowledge of how to program each one of these different types of process control computers. In the method of the invention, however, the engineer needs only to work at the same work station 300 using the same system of menus. Simply by selecting the appropriate types of process control computer and other information (through a menu interface), tailored code created specifically for each type of process control computer is generated automatically.

4.2 Implementation Details

Figure 5:
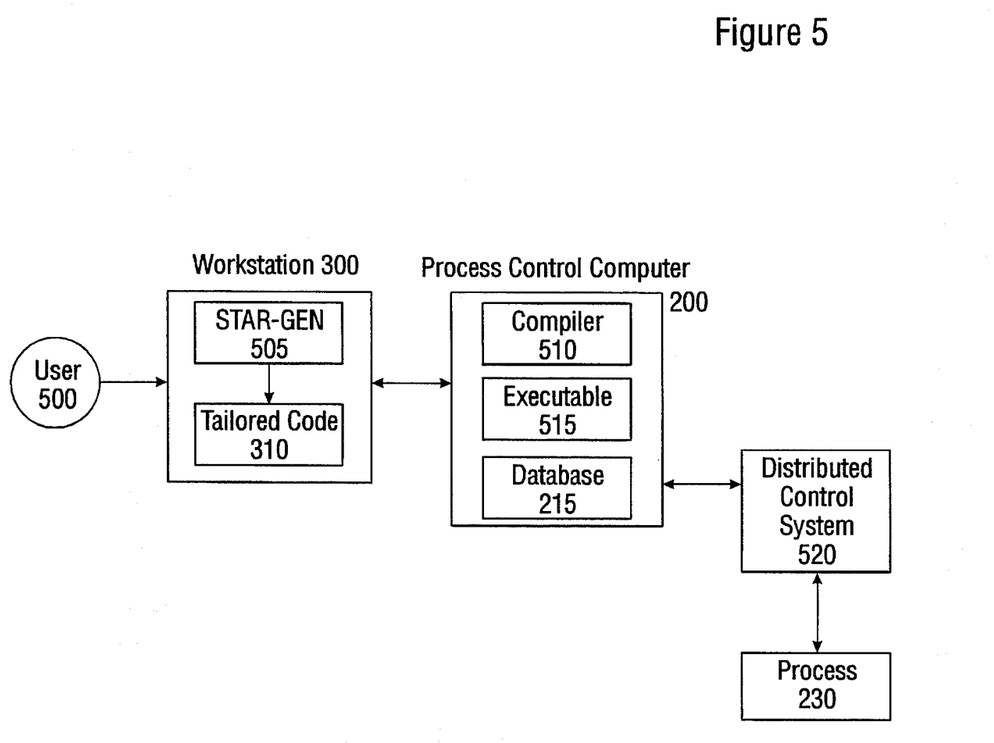
FIG. 5 is a block diagram representing the operational flow of the invention during the development of a process control program.

The means by which the invention generates platform independent, i.e. control computer independent, tailored code is through the operation of a subprogram called STAR-GEN and is described, graphically, in FIG. 5.

A control engineer or user 500 interacts with STAR-GEN 505 via a workstation 300 (running a suitable operating system such as Microsoft Windows). STAR-GEN, through a menu driven interface, prompts the control engineer for system-, problem-, and process-specific information as described above and in microfiche appendices A, B, and C.

For the example shown in FIG. 1, STAR-GEN could prompt the control engineer for information concerning the number and type (e.g., temperature, liquid level, or valve position) of variables and which variables are going to be manipulated (hot, cold and output valve positions 105, 110, and 115 respectively).

When the number and type of variables in the control program have been defined, the number of data locations that will be required for the process control program are also defined. STAR-GEN then provides a menu for the user to enter the names of the data that are going to be used by the control program. These data are most typically defined by names such as, for example, fluid_level or temp_sensor and parameters associated with each variable such as, for example, high_set_point, low_set_point, and current_value. A listing of default names for STAR-GEN's predefined parameters is given in microfiche appendix A, section VARIABLE LISTING. The Instrument Society of America has published a standard convention for naming process variables and parameters, and variations of the ISA Standard are used in most plants. The STAR-GEN predefined parameters are one variation of the standard.

STAR-GEN uses this information to generate platform independent source code, i.e., tailored code 310, automatically. Two important characteristics of the tailored code are (1) it contains calls for storing and/or retrieving all necessary information for the specified process control problem, and (2) the data are stored and/or retrieved using a set of platform independent function calls that have been previously defined in the process control computer. A table of STAR-GEN predefined function calls is listed in microfiche appendix A and reproduced here as Table 1.

After the tailored code 310 is generated it is delivered to the target process control computer platform 200 where it is compiled using a standard, for example, Fortran, compiler.

Compilation of the tailored code using the standard compiler is necessarily preceded by a definition step in which the workings of the platform-independent routines are defined for the target process control computer. For example, the platform-independent function MGETRS, to get a single real value from memory, must have previously been defined on the target platform. If the target platform is a MODCOMP computer using the SPARCS process control subsystem, the MGETRS platform-independent function call would contain a reference to a routine used by the SPARCS system to get a single real value from the database of the SPARCS system.

In most process control computers, there is a method to retrieve from the data base the value associated with a given variable and parameter name. The specific details, however, are different for every process computer. These details, therefore, are included in the system specific information and also within STAR-GEN function calls defined on the process control computer.

Once compiled, the tailored code is in an executable format 515 which, when running, interacts with the control process computer's database 215 and the distributed control system 520. Distributed Control System 520 monitors sensors associated with the process 230 and ensures that manipulated variable targets are enforced.

TABLE 1

| Predefined Database Access Functions | |
|---|---|
| Subroutine Name | Description |
| GETDATE | Get System Date |
| GETTIME | Get System Time |
| MGETRS | Get a single Real from memory |
| MPUTRS | Put a single Real to memory |
| MGETRA | Get an array of Reals from memory |
| MPUTRA | Put an array of Reals to memory |
| MGETIS | Get a single Integer from memory |
| MPUTIS | Put a single Integer to memory |
| MGETIA | Get an array of Integers from memory |
| MPUTIA | Put an array of Integers to memory |
| MGETLE | Get a single Long Integer from memory |
| MPUTLS | Put a single Long Integer from memory |
| MGETLA | Get an array of Long Integers from memory |
| MPUTLA | Put an array of Long Integers from memory |
| FGETRS | Get a single Real from a file |
| FPUTRS | Put a single Real to a file |
| FGETRA | Get an array of Reals from a file |
| FPUTRA | Put an array of Reals to a file |
| FGETIS | Get a single Integer from a file |
| FPUTIS | Put a single Integer to a file |

TABLE 1-continued

Predefined Database Access Functions

| Subroutine Name | Description |
|---|---|
| FGETIA | Get an array of Integers from a file |
| FPUTIA | Put an array of Integers to a file |
| FGETLS | Get a single Long Integer from a file |
| FPUTLS | Put a single Long Integer to a file |
| FGETLA | Get an array of Long Integers from a file |
| FPUTLA | Put an array of Long Integers to a file |

4.2(a) Generation of a Control Computer Library

The definition of a set of platform independent functions for any given process control computer platform is referred to as "filling out the STAR I/O template." This is described in microfiche Appendix A, section CREATING A STAR-I/O TEMPLATE.

For a given process control computer platform, a subset of the platform independent functions listed in Table 1 might actually be used. This subset must be defined. That is to say, out of the selection of template routines listed in Table 1, the routines which will be used for a given platform must be selected. Then each of those routines must be defined by giving a reference to the method for performing the function required by that routine within the process control computer platform specified.

For instance, the platform independent function MGETRS must be defined specifically for each control computer platform. In each process control computer platform, the function of subroutine MGETRS will always be to get a single real value from memory or from the data base of the process control computer. The specific details of how to access the process control computer data base for the given platform must be contained within subroutine MGETRS.

4.2(b) An Extension of STAR-GEN's Capabilities

An important capability of the tailored code generated by STAR-GEN is its ability to write out an ASCII file defining the problem definition. The ASCII file can contain all the process information related to a control process problem. This ASCII problem definition file is known as a controller database update (CDB) file 600 and can be transferred back to a workstation 300 and used to modify the original process control program. (See FIG. 6.) In this manner a hew tailored code may be generated. A derailed description of the CDB's contents is provided in microfiche appendix A.

Figure 6:
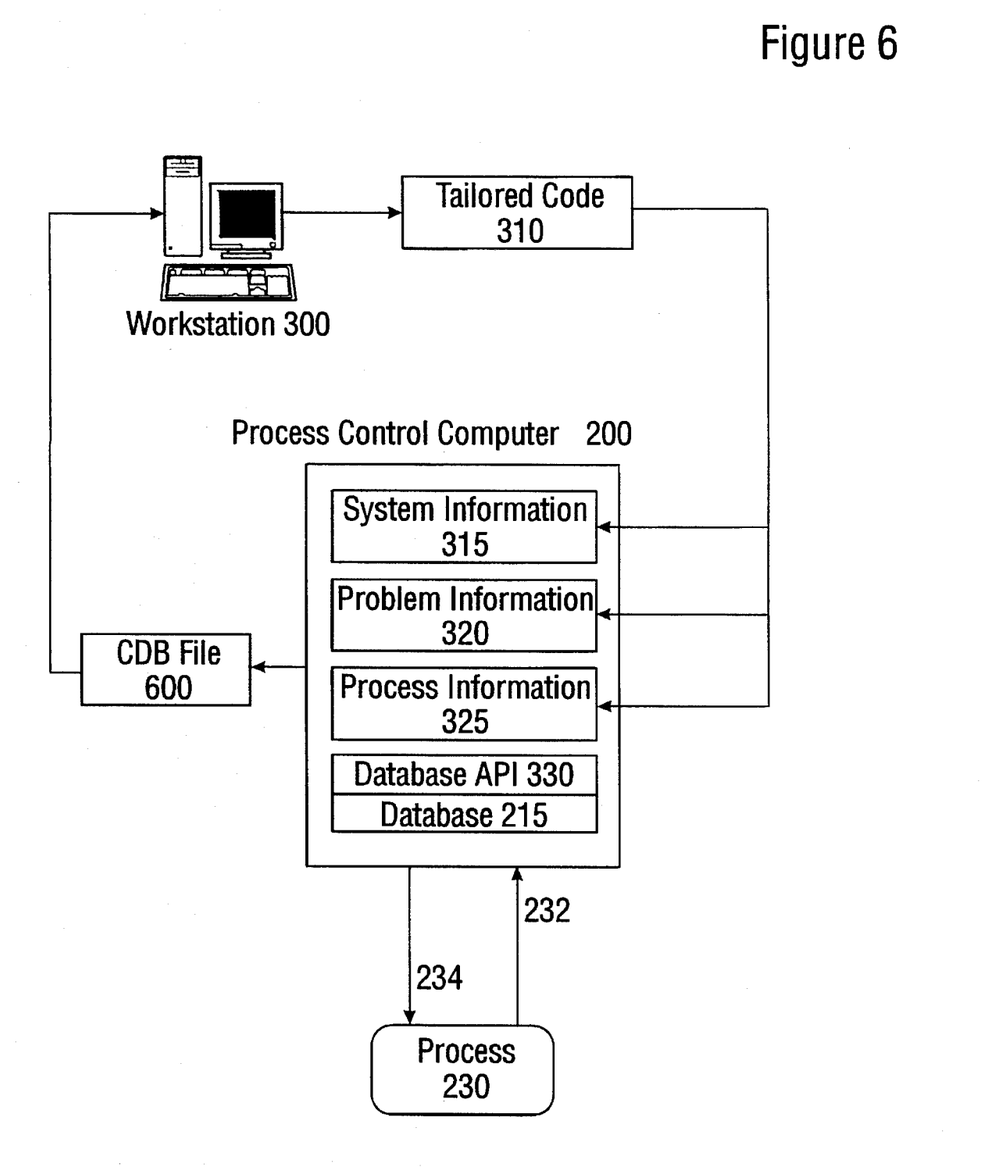
FIG. 6 is a block diagram representing the iterative nature of the invention's process control program development method.

A useful aspect of the CDB file is that if any important process related information has been changed in the database of the process control computer, the new values will be contained in the CDB file. When the CDB file is transferred to the workstation, the process control program may then be modified. For instance, the change may be for the purpose of adding a new variable such as another temperature to the process control problem or, as another example, to port the process control program to another, different, process control computer. In that case, all of the process related information could be restored to the modified process control program.

It will be appreciated by those of ordinary skill having the benefit of this disclosure that numerous variations from the foregoing illustration will be possible without departing from the inventive concept described herein. For example, while the embodiment described herein is to perform a regulatory control task, the same technique could be used to automatically generate a program to perform economic optimization, where economic optimization means using a steady-state model of an economic process to calculate the operating conditions that would minimize the cost of the operation or to maximize the operation's profitability. Similarly, this technique could be used to create a data reconciliation program which would gather sensor readings from a process and use a steady state model to determine if any of the sensors were not accurate. Accordingly, it is the claims set forth below, and not merely the foregoing illustration, which are intended to define the exclusive rights claimed in this application program.

What is claimed is:

1. A method executed by a general purpose computer of generating a machine-executable multivariable process control program file, referred to as Program A, for a process control computer platform, comprising the steps of:

(a) transmitting a signal, referred to as a problem-description signal, to the control computer platform, where said problem-description signal encodes (i) the number and respective types of a plurality of parameters being controlled, and (ii) process response relationship information about a plurality of combinations of respective ones of said parameters;

(b) generating a signal, referred to as a function-call signal, encoding one or more statements selected from a set of platform-independent function call statements;

(c) translating said function-call signal into another signal, referred to as a source-code signal, said source-code signal encoding a plurality of instructions from a source level computer programming language that are independent of said control computer platform;

(d) transmitting said source-code signal to said control computer platform;

(e) causing execution of a compiler program at the control computer platform, to compile said source-code signal into said Program A.

2. The method of claim 1, wherein said source-code signal encodes a plurality of instructions from a Fortran source level computer programming language.

3. The method of claim 1, wherein said source-code signal encodes instructions for generating a controller database update file.

4. The method of claim 1, wherein said problem-description signal encodes information stored in a controller database update file, said controller database update file being generated by execution of another executable program file, referred to as Program B.

5. The method of claim 4, wherein said Program B is an earlier version of said Program A and said Program B executes on said control computer platform.

* * * * *